(12) United States Patent
Last

(10) Patent No.: US 11,571,995 B2
(45) Date of Patent: Feb. 7, 2023

(54) QUICK-RELEASE SEAT FITTING

(71) Applicant: Textron Innovations, Inc., Providence, RI (US)

(72) Inventor: Brent William Last, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 191 days.

(21) Appl. No.: 17/101,298

(22) Filed: Nov. 23, 2020

(65) Prior Publication Data

US 2021/0155127 A1 May 27, 2021

Related U.S. Application Data

(60) Provisional application No. 62/940,023, filed on Nov. 25, 2019.

(51) Int. Cl.
*B60N 2/30* (2006.01)
*B60N 2/005* (2006.01)
*F16B 2/18* (2006.01)
*B60N 2/015* (2006.01)

(52) U.S. Cl.
CPC .......... *B60N 2/3097* (2013.01); *B60N 2/005* (2013.01); *B60N 2/01508* (2013.01); *F16B 2/185* (2013.01)

(58) Field of Classification Search
CPC ............ B60N 2/01575; B60N 2/01558; B60N 2/01525; B60N 2/005; B60N 2/3097; B60N 2/01508
USPC .................................................. 248/222.14
See application file for complete search history.

(56) References Cited

U.S. PATENT DOCUMENTS

| | | | |
|---|---|---|---|
| 5,975,822 A | 11/1999 | Ruff | |
| 7,021,596 B2 | 4/2006 | Lory | |
| 7,686,368 B2 | 3/2010 | Ghergheli et al. | |
| 7,975,979 B2 | 7/2011 | Bishop | |
| 8,845,249 B2 | 9/2014 | Rowles | |
| 9,663,232 B1 | 5/2017 | Porter et al. | |
| 10,618,658 B2 | 4/2020 | Thomaschewski | |
| 2002/0148324 A1* | 10/2002 | Bandarra | B62K 21/12 74/551.4 |
| 2010/0308190 A1 | 12/2010 | Tkocz | |
| 2012/0328364 A1* | 12/2012 | Tkocz | B64D 11/04 403/322.4 |

FOREIGN PATENT DOCUMENTS

CZ 2000-3295 A3 * 4/2002

* cited by examiner

*Primary Examiner* — Milton Nelson, Jr.
(74) *Attorney, Agent, or Firm* — Avek IP, LLC

(57) ABSTRACT

A seat configured for removably securing to a track includes a quick-release fitting for operation by hand to releasably secure a bottom end of a seat leg to a floor-mounted track for facile adjustment and removal of the seat. A threaded stud includes a shaft portion arranged through an opening in an end of the seat leg and a radially extending base. A pivot mechanism has a through-hole arranged around the shaft portion of the threaded stud. A first transverse member and a second transverse member each extend transversely from the pivot mechanism in opposite directions along a pivot axis. A lever is configured to pivot about the pivot axis causing the threaded stud to move up or down via the pivot mechanism, which raises and lowers the radially extending base for alternately securing the seat leg to the track and releasing the seat leg from the track.

20 Claims, 10 Drawing Sheets

QUICK-RELEASE SEAT FITTING

CROSS-REFERENCE TO RELATED APPLICATIONS

This application claims the benefit of U.S. Provisional Patent Application Ser. No. 62/940,023, entitled Quick-Release Seat Fitting, and filed Nov. 25, 2019, the disclosure of which is herein incorporated by reference in its entirety.

BACKGROUND

1. Field

Embodiments of this disclosure relate generally to aircraft interior installations and more specifically to toolless quick-release fittings for aircraft seats.

2. Description of the Related Art

Many different types of quick-release fittings are known. For example, U.S. Patent Application Publication 2010/0308190 to Tkocz discloses a quick-release device for mounting cabinets to galley floors in airplanes. The device includes a clamp lever 7 that is pivotable for translating a threaded bolt 18 to move a T-nut 13 for engaging in a T-groove 15 of a seat rail 6. However, Tkocz relies on a spring 14 to unlock the T-nut 13 and Tkocz's lever 7 uses a U-shaped member 8 to raise the bolt 18.

U.S. Pat. No. 8,845,249 to Rowles discloses a toolless quick release device for attaching equipment to floor fittings. However, Rowles' quick release device 10 includes an outer retainer 15 and an inner retainer 20, which both have a center hole for receiving a stud 11. When a user rotates the inner retainer 20, the stud is rotated in tandem so that a locking portion 12 of the stud 11 engages a lug segment 5.

U.S. Pat. No. 9,663,232 to Porter et al. discloses an aircraft seat assembly that includes a clamping shaft that has a base member received in a track assembly and a shaft that extends from the base member through a foot assembly of the seat. Specifically, Porter discloses a clamping shaft 60 that is rotatable between lock/unlock positions for securing a base member 80 in a slot 44 of a track assembly 20. However, Porter's assembly uses a locking collar 62 having a second collar portion 92 configured to engage a foot assembly 22, and a spring 66. Also, Porter's latching lever 70 is rotated to rotate the locking collar 62 between the unlock position and the lock position.

U.S. Pat. No. 5,975,822 to Ruff discloses a quick-release fitting for securing equipment to a track for aircraft. Ruff's fitting 10 includes a threaded bolt 18 for rotating a plunger 8 for securing a foot 13 within a floor mounting channel 12. However, the threaded bolt 18 is arranged perpendicular to the plunger 8 such that the bolt 18 is moved sideways to rotate the plunger for release from the mounting channel 12.

U.S. Pat. No. 7,021,596 to Lory discloses a quick-release seat fitting for securing a seat to an aircraft floor track. A plurality of cam members 28A-F are secured in a floor track 12 via a lock nut 36. However, Lory uses a bar linkage 60 to rotate the cam members 28A-F for securing to the floor track 12.

U.S. Pat. No. 7,975,979 to Bishop discloses an airplane seat track having a hollow slide track that includes a series of equidistant circular receptacle sections 12 with circular upper openings for receiving fittings of airplane seats. Bishop also discloses that a fitting 2 may be secured to a seat leg, and the fitting 2 has a series of pairs of opposite side tabs 14 for sliding under intermediate lip sections of the track 1, which retain the tabs 14. However, a securing element 3 and a screw 4 are used to secure and clamp the fitting 2 in the seat track 1.

U.S. Pat. No. 10,618,658 to Thomaschewski discloses a floor connection assembly of an aircraft seat, which includes fastening elements 2 that may be screwed, clamped and/or otherwise mechanically connected to the seat rail 5 at a fastening point. The seat is movable based on displaceability of the fastening elements 2 in the seat rail 5.

U.S. Pat. No. 7,686,368 to Ghergheli et al. discloses a system for configuring back seats of a passenger vehicle. For example, Ghergheli discloses a seat 10 that is moveable along a seat track 22. A removable vehicle seat coupled to a seat track is also disclosed. Ghergheli discloses a rear track engagement device 42 that releases from the seat track 22 and reengages with the seat rack.

SUMMARY

In an embodiment, a quick-release seat fitting configured for removably securing a seat leg to a track is provided. The quick-release seat fitting includes a longitudinal member having a first end, a second end opposite the first end, and a middle portion between the first end and the second end. The first end has a radially extending flange, the second end has a radially extending hub, and the middle portion extends longitudinally through a hole in a bottom end of the seat leg. A pivot mechanism has a ring portion, a first transverse member, and a second transverse member. The first transverse member and the second transverse member each extend oppositely outside of the ring portion along a pivot axis, and the longitudinal member extends through a through-hole of the ring. A lever has a first slot and a second slot opposite the first slot. The first slot and the second slot are configured to accept the first transverse member and the second transverse member, respectively, such that the lever is pivotable about the pivot axis. The lever is configured to raise the longitudinal member via the pivoting mechanism and the radially extending flange for securing the radially extending hub to the track.

In another embodiment, a quick-release seat fitting includes a seat leg configured to be removably secured to a track, a threaded stud having a shaft portion between a first end and a second end. The shaft portion is arranged through an opening in an end of the seat leg, and the second end includes a radially extending base. A pivot mechanism has a through-hole arranged around the shaft portion of the threaded stud. A first transverse member and a second transverse member each extend transversely from the pivot mechanism in opposite directions along a pivot axis. A lever has a first slot and a second slot configured to accept the first transverse member and the second transverse member, respectively. Pivoting of the lever about the pivot axis causes the threaded stud to move up or down via the pivot mechanism, which raises and lowers the radially extending base for alternately securing the seat leg to the track and releasing the seat leg from the track.

In yet another embodiment, a seat configured for removably securing to a track includes a quick-release fitting for operation by hand to releasably secure a bottom end of a seat leg to a floor-mounted track for facile adjustment and removal of the seat. The quick-release seat fitting includes a threaded stud having a shaft portion between a first end and a second end. The shaft portion is arranged through an opening in an end of the seat leg, and the second end includes a radially extending base. A pivot mechanism has a through-hole arranged around the shaft portion of the threaded stud. A first transverse member and a second transverse member each extend transversely from the pivot mechanism in opposite directions along a pivot axis. A lever has a first slot and a second slot configured to accept the first transverse member and the second transverse member, respectively. Pivoting of the lever about the pivot axis causes the threaded stud to move up or down via the pivot mechanism, which raises and lowers the radially extending base for alternately securing the seat leg to the track and releasing the seat leg from the track.

BRIEF DESCRIPTION OF THE DRAWINGS

Illustrative embodiments of the present disclosure are described in detail below with reference to the attached drawing figures, which are incorporated by reference herein and wherein.

Figure 1:
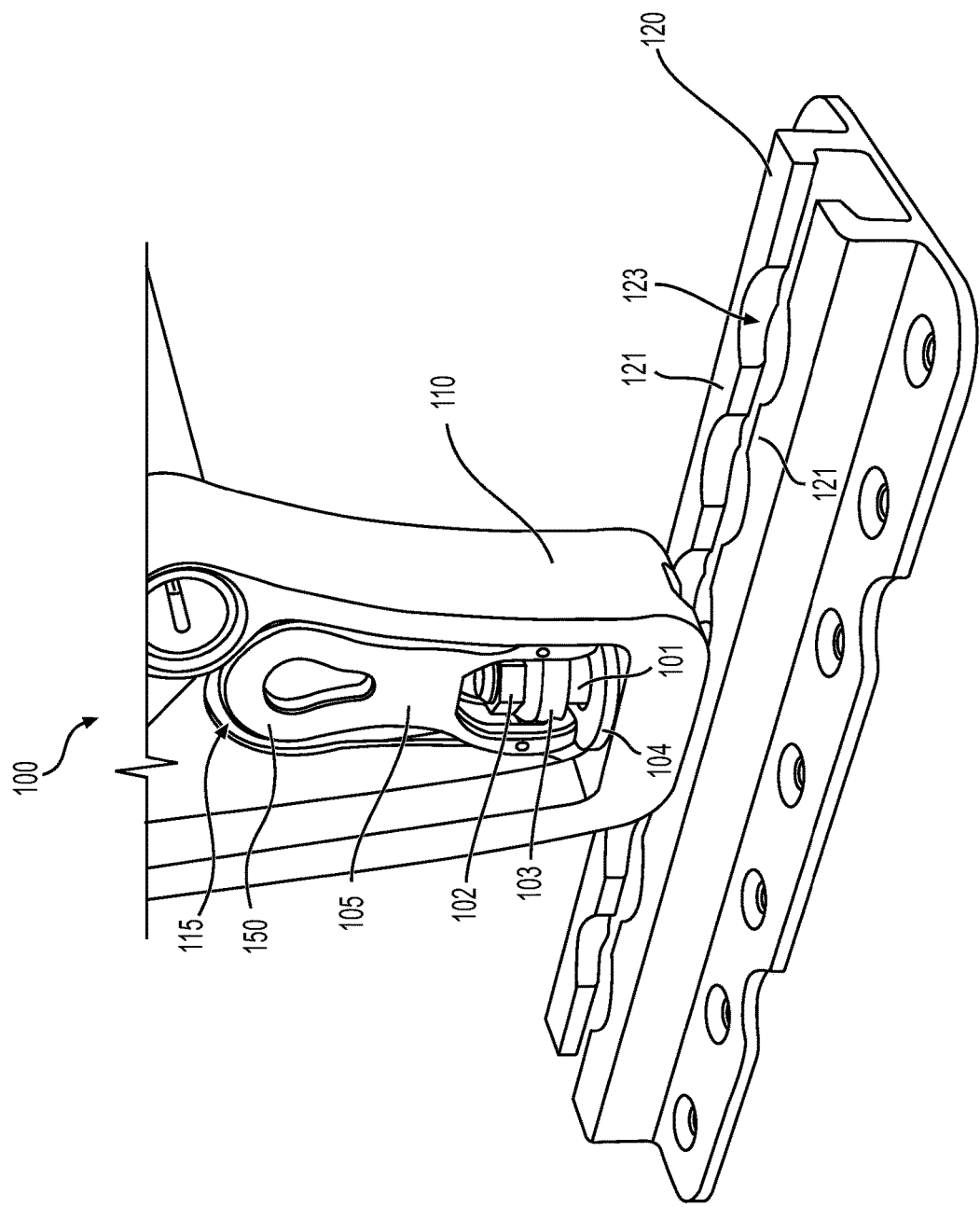
FIG. 1 provides a perspective view of an embodiment of a quick-release seat fitting integrated into a seat leg.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Typical fittings for mounting seats onboard aircraft are relatively heavy and require tools for installation and/or removal. Additionally, the fittings often have "free play" within a floor-mounted track that requires tightening via mechanisms that require tools. When converting an aircraft between different interior configurations, removal and reinstallation of seats may therefore be time consuming. In some cases, the seat fittings and associated tightening mechanisms require parts that could become lost (e.g., "loose equipment") when repeatedly changing aircraft configurations. In other cases, the tightening mechanisms include levers that are bulky and not integral with the seat design, making them cumbersome and less user friendly.

Embodiments of the present disclosure provide a quick-release seat fitting that enables rapid installation and removal of seats to accommodate different aircraft configurations without requiring tools, loose equipment, or adjustments of the seat fitting to remove free play in the floor track. The quick-release seat fitting is integrated into the seat leg along the lower portion of the seat leg (e.g., a foot of the seat leg).

FIG. 1 is a perspective view of an exemplary quick-release seat fitting 100 integrated into a seat leg 110. Seat leg 110 removably couples with a track 120 via quick-release seat fitting 100. Track 120 has a lower portion that is securable to a surface, such as a floor, by a suitable attachment means such as screws, bolts, rivets, brackets, etc. In an upper portion, track 120 includes a plurality of notches 123 that enable removal of quick-release seat fitting 100 from track 120. Between each of the plurality of notches 123, the upper portion of track 120 includes pairs of opposing flanges 121 that provide a narrower gap compared to notches 123. The gap between flanges 121 is wide enough to fit the middle portion of a longitudinal member 101 therebetween, which enables seat leg 110 to be slid along the track for repositioning the seat leg without removal from track 120. The quick-release seat fitting 100 is secured to track 120 via flanges 121 as further described below in connection with FIG. 8. Not all flanges 121 and notches 123 in track 120 are enumerated for clarity of illustration.

Quick-release seat fitting 100 is configured to be actuated via a lever 105. When lever 105 is in the first position, seat leg 110 is secured to track 120 via quick-release seat fitting 100; when lever 105 is in the second position, seat leg 110 is released via quick-release seat fitting 100 such that seat leg 110 may be moved along track 120 (e.g., to adjust position of seat leg 110 or to remove seat leg 110 from track 120). In certain embodiments, the first position of lever 105 is a substantially vertical orientation (e.g., as shown in FIG. 1) and the second position of lever 105 is a substantially horizontal orientation (e.g., as shown in FIG. 2).

One end of lever 105 includes a handle 150 to provide a user interface. Lever 105 is pivotable between a vertical position as depicted in FIG. 1, and a horizontal position as depicted in FIG. 2. In the vertical position, lever 105 is aligned within a recess 115 of seat leg 110. A user may pivot lever 105 by hand (e.g., via a thumb and/or one or more fingers) providing toolless actuation of lever 105 for alternately releasing and locking seat leg 110 to track 120.

Figure 2:
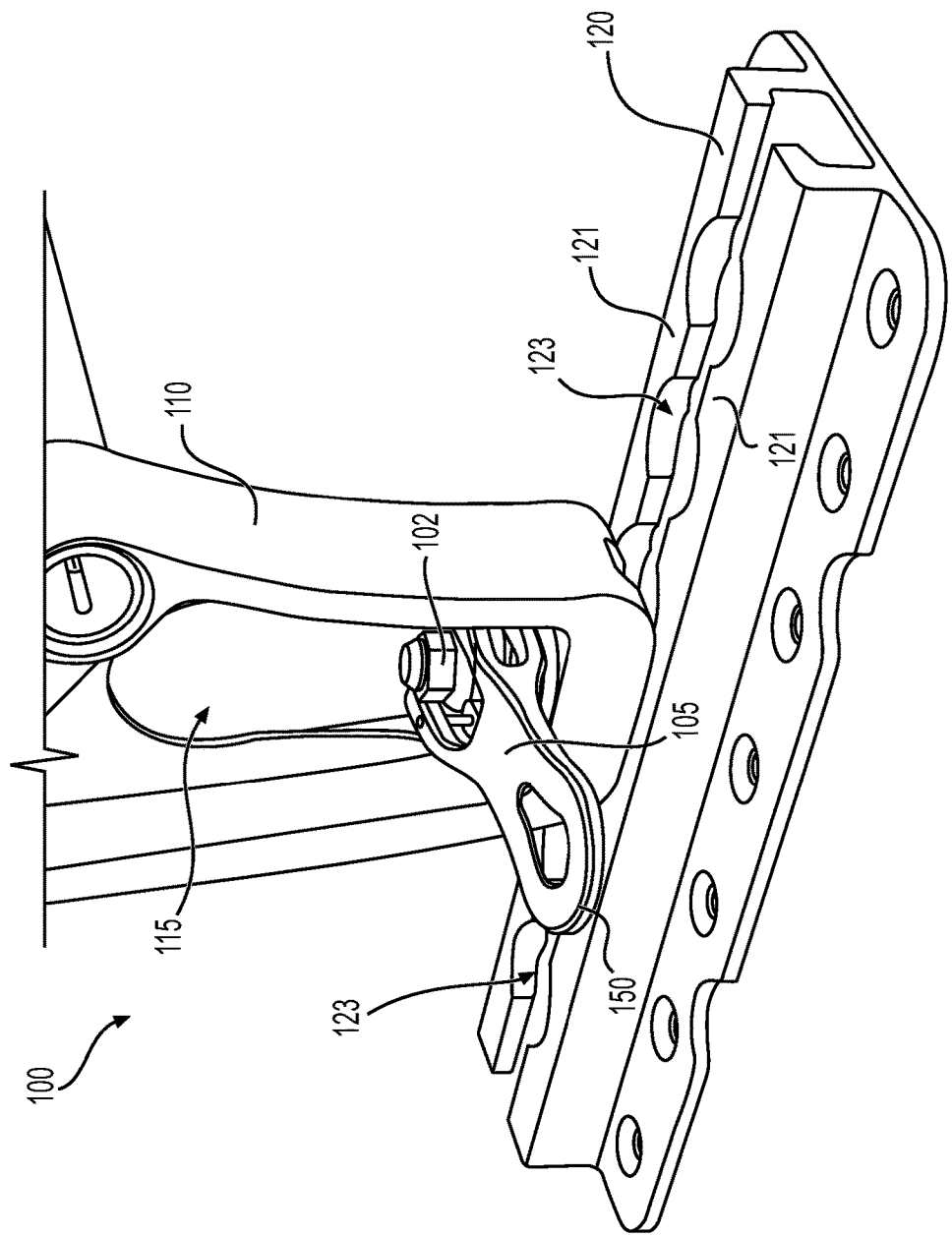
FIG. 2 provides a perspective view of the quick-release seat fitting of FIG. 1.

FIG. 2 is a perspective view of quick-release seat fitting 100 of FIG. 1 in which lever 105 has been pivoted out of recess 115 to the horizontal orientation. In the vertical orientation of lever 105, seat leg 110 is secured to track 120, as further described below in connection with FIG. 8. In the horizontal orientation of lever 105, seat leg 110 is released, which permits removal of seat leg 110 from track 120 or sliding of seat leg 110 along track 120, as further described below in connection with FIG. 9. Note that the horizontal position of lever 105 may be attained by downwardly flipping lever 105 in either direction (e.g., towards the viewer, as depicted in FIG. 2, or away from the viewer, not shown).

Figure 3:
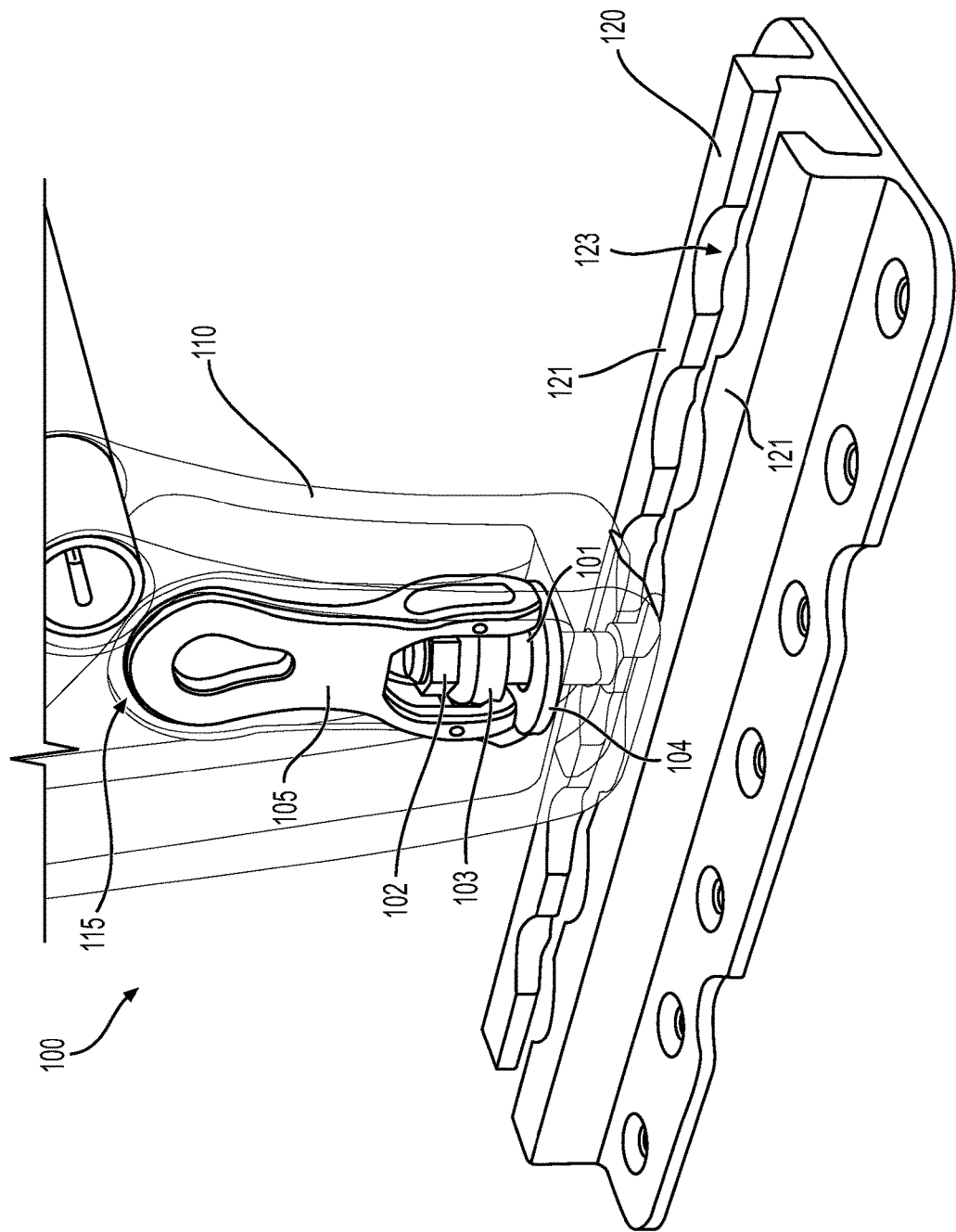
FIG. 3 provides a perspective view of the quick-release seat fitting of FIG. 1 in which a seat leg is depicted to be transparent to enable viewing of internal components.
Figure 4:
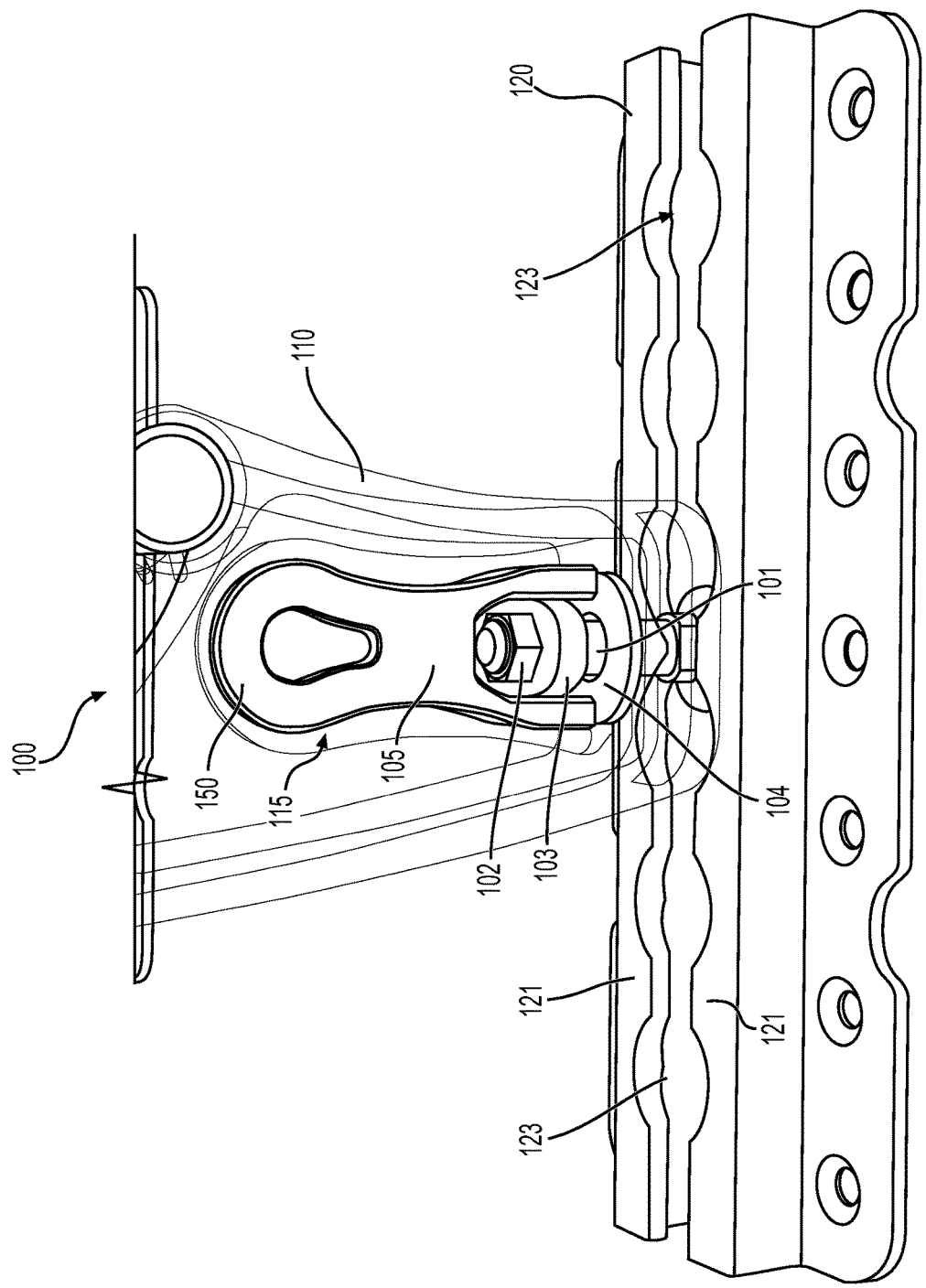
FIG. 4 provides another perspective view of the quick-release seat fitting of FIG. 1 in which the seat leg is depicted to be transparent to enable viewing of internal components.

FIG. 3 and FIG. 4 provide perspective views of quick-release seat fitting 100 of FIG. 1 in which seat leg 110 is depicted to be transparent to enable viewing of internal components. FIGS. 3 and 4 are best viewed together with the following description. Longitudinal member 101 is vertically arranged to pass through an opening (e.g., a through-hole) in the bottom of seat leg 110. An optional washer 104 may be disposed beneath the lever to provide a wear surface between the lever 105 and seat leg 110. Washer 104 is a metal washer configured to provide a stiff and wear-resistant surface. In some embodiments, a rubber washer (not shown) may also be placed between washer 104 and seat leg 110 to add some spring force that will assist with rotation of lever 105 between the vertical position and the horizontal position, while also assisting with lever 105 to stay in the vertical position.

A pivot mechanism 103 is arranged inside lever 105 such that lever 105 is pivotable between the first position and the second position, as further described below in connection with FIGS. 5-9.

Figure 5:
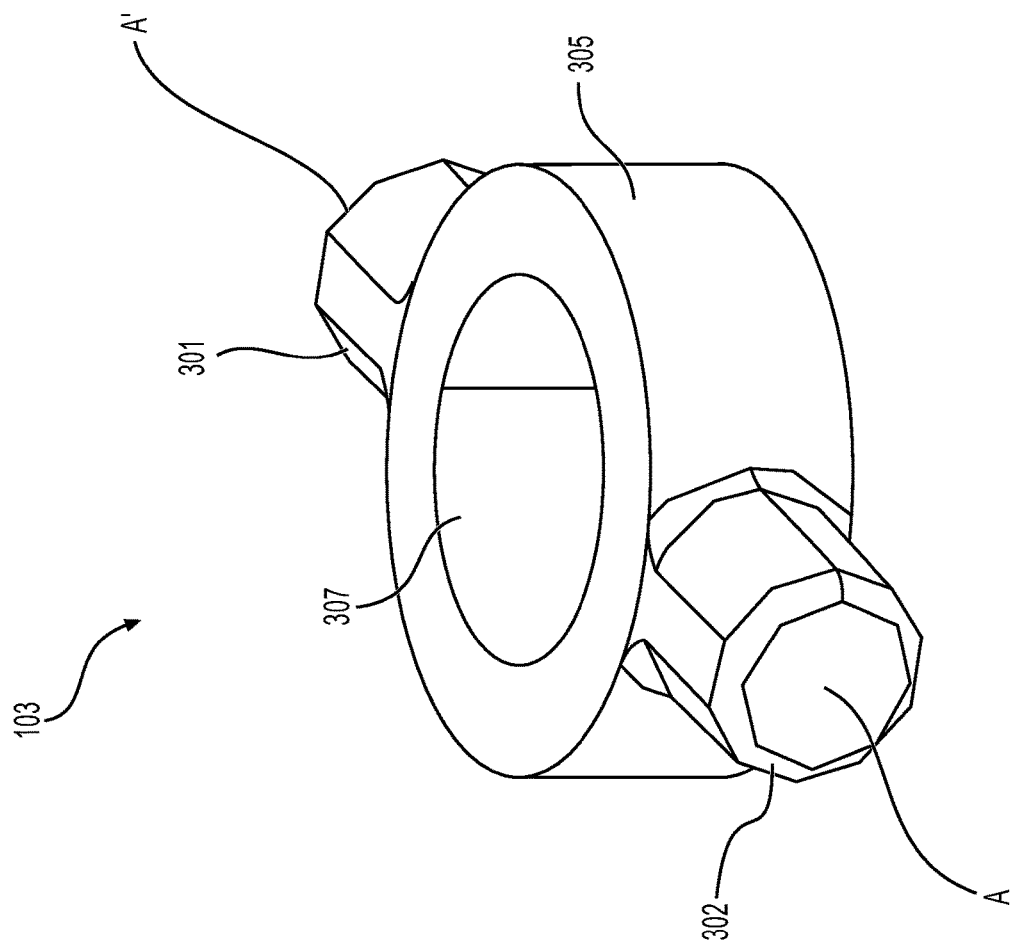
FIG. 5 provides a perspective view of a pivot mechanism used in the quick-release seat fitting FIG. 1, in an embodiment.

FIG. 5 provides a perspective view of an exemplary pivot mechanism 103 used in the quick-release seat fitting 100 of FIGS. 1-4. Pivot mechanism 103 includes a first transverse member 301 and a second transverse member 302 that each extend transversely from opposite sides of a ring portion 305. The first and second transverse members 301, 302 are configured to insert into slots of lever 105, as further described below in connection with FIG. 6. Ring portion 305 includes a through-hole 307, which is a hole that passes radially through the center of ring portion 305. Through-hole 307 is adapted to receive longitudinal member 101 such that longitudinal member 101 and ring portion 305 may move freely with respect to one another. A pivot axis of pivot mechanism 103 is depicted along the line A-A'. Lever 105 rotates about pivot axis A-A' of pivot mechanism 103 when flipped between the first and second positions.

Figure 6:
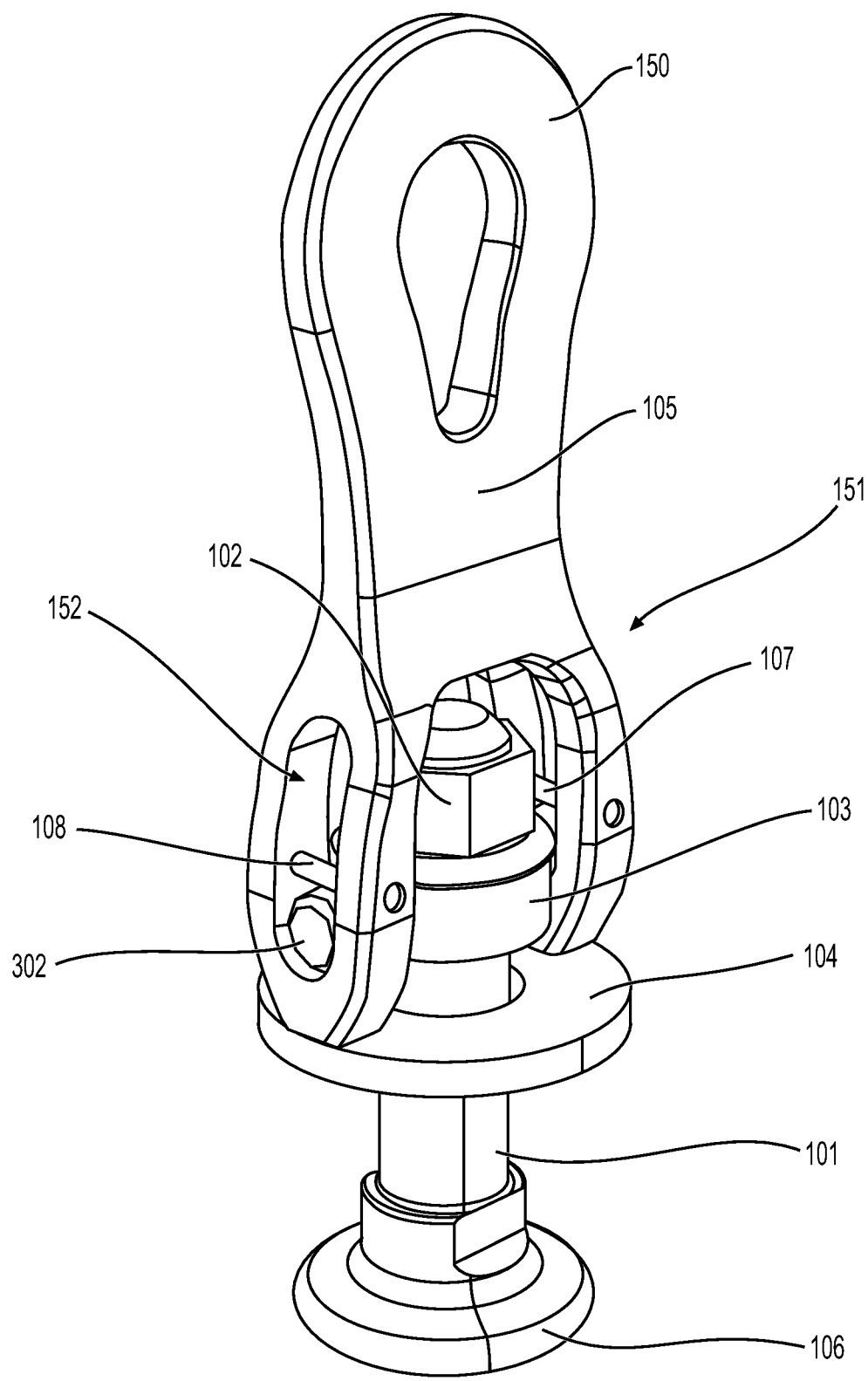
FIG. 6 provides a perspective view of components of the quick-release seat fitting FIG. 1 having been removed from the seat leg to enable improved viewing of featured components.

FIG. 6 provides a perspective view of components of quick-release seat fitting 100 of FIGS. 1-4 having been removed from seat leg 110 and track 120 to enable improved viewing of featured components. Longitudinal member 101 includes a base 106 mechanically coupled to its lower end. Base 106 is a radially extending base or hub located at a second (e.g., bottom) end of longitudinal member 101. Base 106 has a larger diameter than longitudinal member 101 and is configured for inserting into a notch of track 120, as further described below in connection with FIGS. 8 and 9.

Pivot mechanism 103 is disposed around longitudinal member 101 with its transverse members 301 and 302 extending into slots on either side of lever 105. Specifically, first transverse member 301 extends into a first slot 151 (not visible in the view of FIG. 6), and second transverse member 302 extends into a second slot 152. A retaining pin 107 is disposed across first slot 151 and is configured to retain transverse member 302 in a lower portion of the first slot 151. An identical retaining pin 108 is disposed across second slot for retaining second transverse member 302. The slots and retaining pins allow the transverse members to rotate within the slots, thereby enabling lever 105 to pivot about an axis through first and second transverse members 301, 302. As one of skill in the art will recognize, the slots 151, 152 and pins 107, 108 provide one means of constraining transverse members 301, 302 while allowing rotation of lever 105 about the pivot axis of pivot mechanism 103, but variations of what is depicted herein may be incorporated into quick-release seat fitting 100 without departing from the scope hereof.

Longitudinal member 101 includes a radially extending flange 102. The radially extending flange 102 provides a mechanical coupling between longitudinal member 101 and pivot mechanism 103. When pivot mechanism 103 is raised via lever 105, longitudinal member 101 is raised via radially extending flange 102 in contact with pivot mechanism 103. When pivot mechanism 103 is lowered via lever 105, radially extending flange 102 and longitudinal member 101 are allowed to lower due to gravity.

In certain embodiments, longitudinal member 101 is a threaded stud having threads at its first (upper) end, and radially extending flange 102 is a nut having threads adapted for coupling with the threaded stud. In this manner, radially extending flange 102 is threaded onto longitudinal member 101 adjacent pivot mechanism 103. The position of radially extending flange 102 is therefore adjustable by rotating radially extending flange 102 via the threads on the upper shaft portion of longitudinal member 101. Radially extending flange 102 provides a limit for how far longitudinal member 101 extends downwardly into track 120. For example, the higher radially extending flange 102 is positioned about longitudinal member 101, the further longitudinal member 101 is lowered with respect to seat leg 110. Conversely, when radially extending flange 102 is adjusted to a lower position, longitudinal member 101 is raised with respect to seat leg 110. Adjusting position of radially extending flange 102 allows for adjustment in how tight quick-release seat fitting 100 secures seat leg 110 to track 120 when lever 105 is in the first position, as further described below in connection with FIG. 8. Also, the adjustable position of radially extending flange 102 determines how loose quick-release seat fitting 100 becomes when lever 105 is in the second position (e.g., for moving seat leg 110 along track 120), as further described below in connection with FIG. 9. In certain embodiments, radially extending flange 102 is lockable (e.g., via a self-locking nut, a locking washer, or an epoxy resin). By using a self-locking mechanism, the position of radially extending flange 102 along longitudinal member 101 may be maintained over time with no additional parts required.

Figure 7:
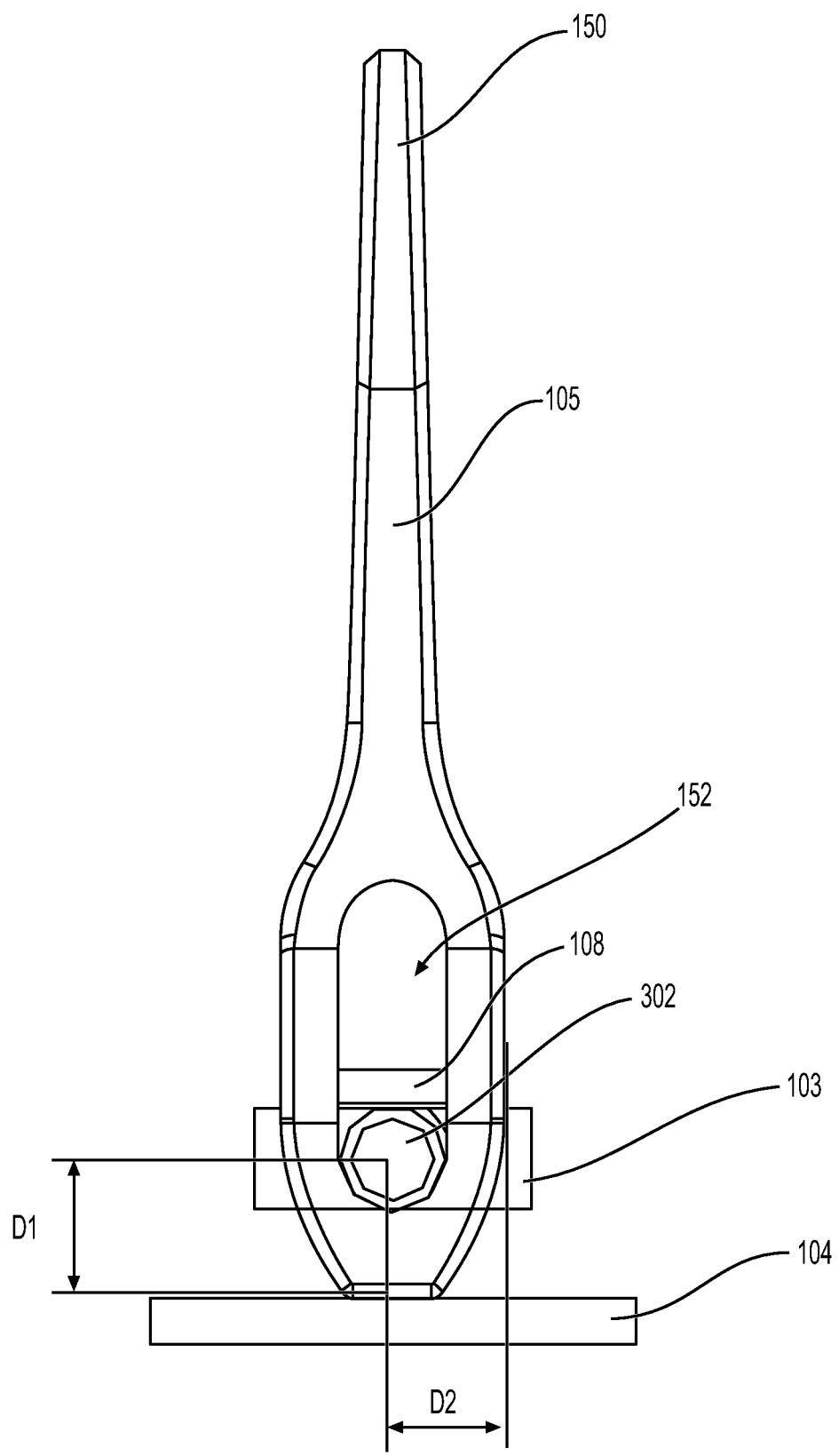
FIG. 7 provides a side view of components of the quick-release seat fitting of FIG. 6 some components removed to further improve viewing of featured components.

FIG. 7 provides a side view of components of quick-release seat fitting 100 of FIG. 6 with longitudinal member 101 and radially extending flange 102 removed to further improve viewing of featured components. As depicted in FIG. 7, lever 105 is vertically oriented in the first position for tightening quick-release seat fitting 100. A first distance D1 represents the distance between the pivot axis of pivot mechanism 103 and the bottom surface of lever 105. A second distance D2 represents the distance between the pivot axis of pivot mechanism 103 and a façade of lever 105. Note that second distance D2 may be measured between the pivot axis and either façade of lever 105 since the profile of lever 105 is symmetrical and lever 105 may be pivoted downwardly in either direction (e.g., to the left or right in FIG. 7) to reach the second position.

In embodiments depicted herein, lever 105 is configured such that first distance D1 is greater than second distance D2. The difference between first distance D1 and second distance D2 (e.g., D1−D2) may be relatively small. For example, in certain embodiments, first distance D1 is about 0.25-inch whereas second distance is about 0.2-inch, which provides a difference of only about 0.05-inch. However, a small difference is sufficient for securing and releasing base 106 when lever 105 is pivoted between first and second positions. In embodiments where D1>D2 (as depicted herein), when lever 105 is oriented vertically, pivot mechanism 103 is comparatively raised (e.g., with respect to washer 104), versus when lever 105 is oriented horizontally, pivot mechanism 103 is comparatively lowered. The difference between the raised and lowered positions of pivot mechanism 103 is the same as the difference between first distance D1 and second distance D2 (e.g., D1−D2). This is further illustrated in FIGS. 8 and 9.

In an alternative embodiment (not shown), lever 105 may be configured such that D1 is smaller than D2, in which case flipping lever 105 would have the opposite effect (e.g., the first (vertical) position of lever 105 would release seat fitting 100 from track 120 and the second (horizontal) position of lever 105 would secure seat fitting 100 to track 120).

Figure 8:
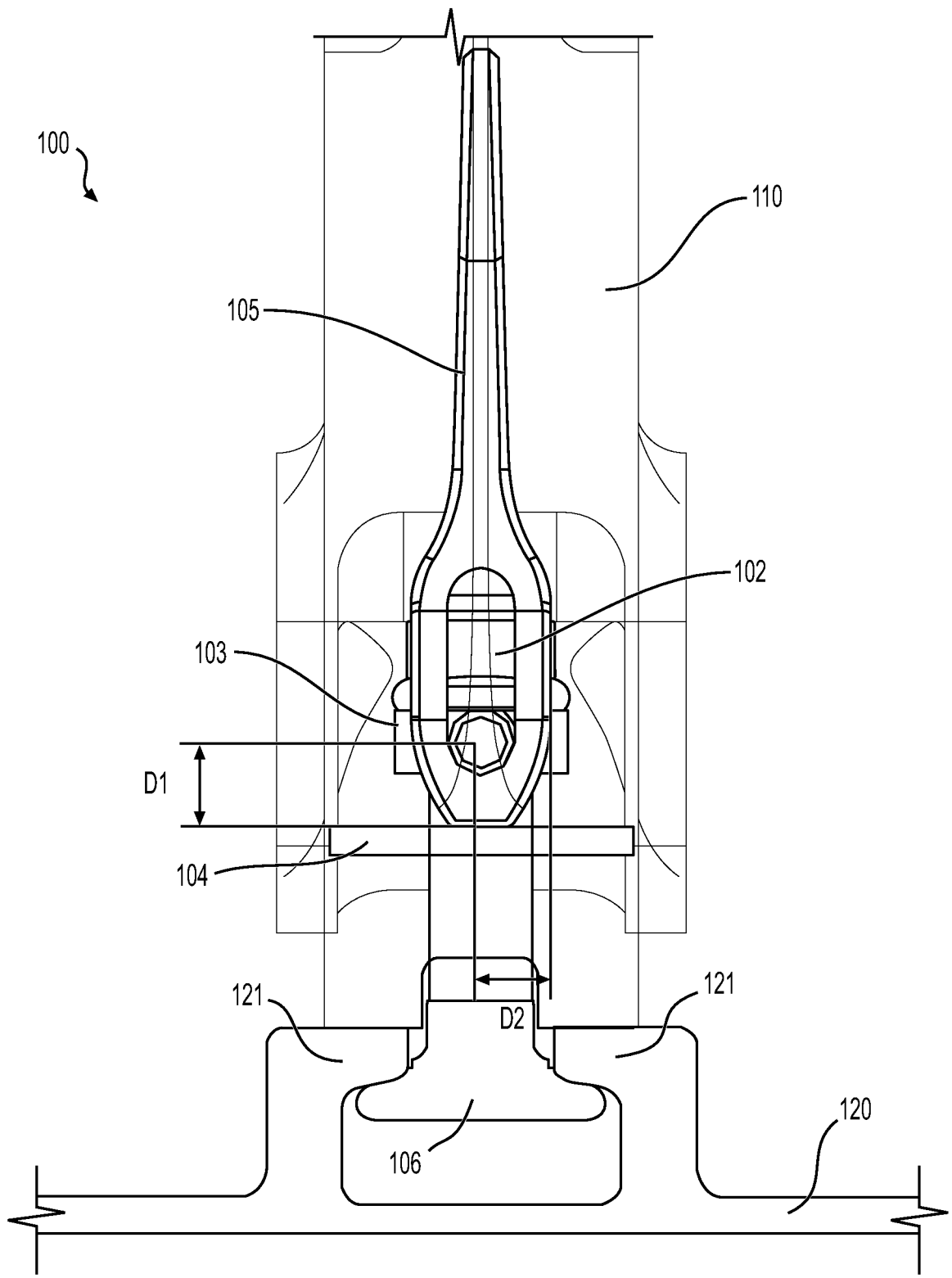
FIG. 8 provides a cross-sectional side view of the quick-release seat fitting of FIG. 1 in which the seat leg is depicted to be transparent to enable viewing of internal components.
Figure 9:
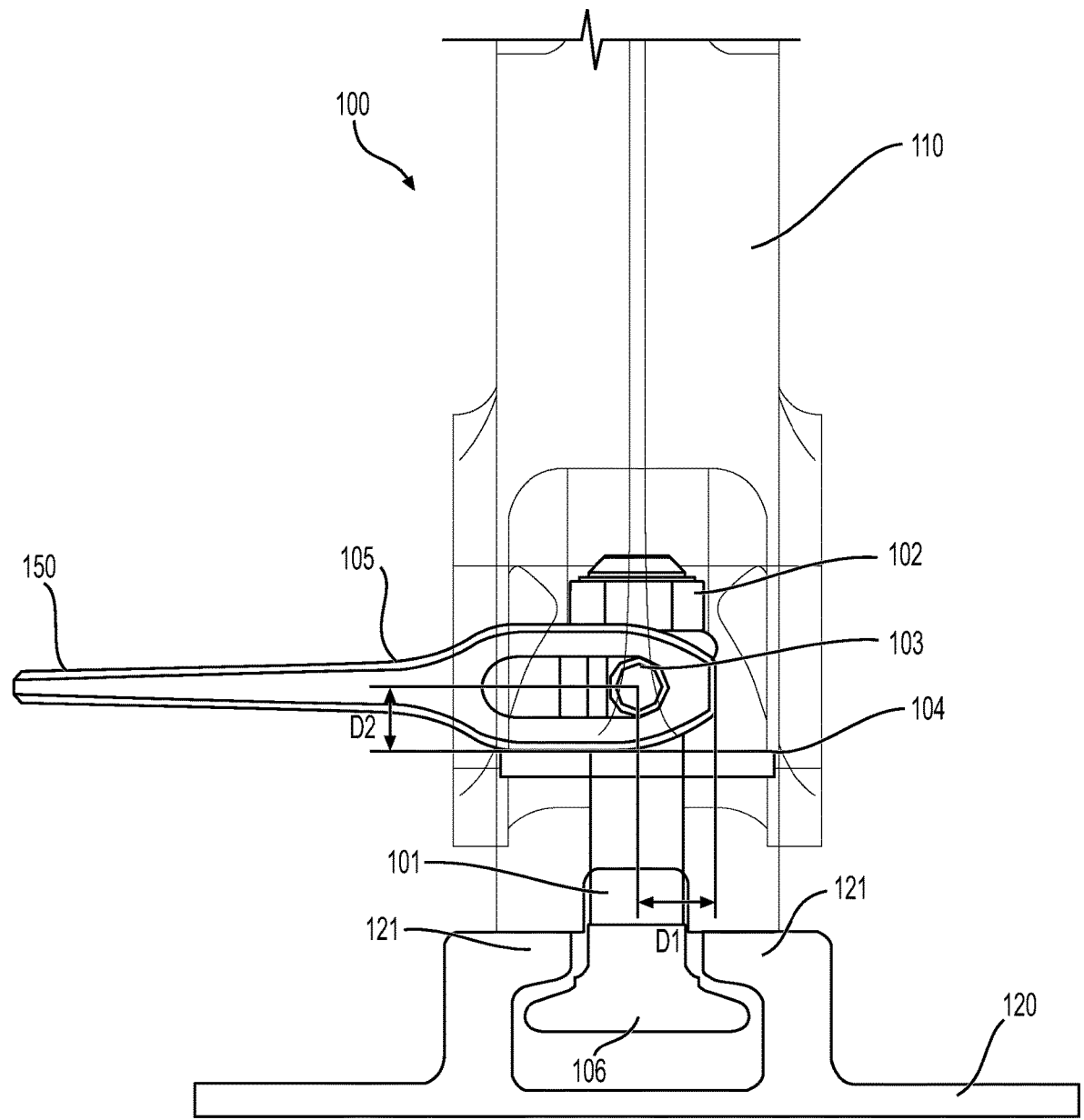
FIG. 9 provides another cross-sectional side view of the quick-release seat fitting of FIG. 1 in which the seat leg is depicted to be transparent to enable viewing of internal components.

FIG. 8 and FIG. 9 provide cross-sectional side views of quick-release seat fitting 100 of FIG. 1 in which seat leg 110 is depicted to be transparent to enable viewing of internal components. FIGS. 8 and 9 are best viewed together with the following description. Base 106 has a larger diameter than longitudinal member 101, as described above in connection with FIG. 6, such that base 106 extends radially beneath the pair of opposing flanges 121 of track 120. The bottom of seat leg 110 (e.g., a foot of seat leg 110) rests against an upper side of a pair of flanges 121. In this manner, the base 106 and seat leg 110 alternately squeeze and release the pair of flanges 121 as lever 105 is flipped between the first and second positions, thereby alternately securing in place and releasing seat leg 110 along track 120.

In operation, as lever 105 is pivoted from the first position to the second position, pivot mechanism 103 lowers longitudinal member 101 downwardly via radially extending flange 102, thereby releasing base 106 from contacting a pair of flanges 121. Conversely, as lever 105 is pivoted from the second position back to the first position, pivot mechanism 103 raises longitudinal member 101 upwardly via radially extending flange 102, which presses base 106 in contact with one pair of flanges 121 of track 120 for securing thereto.

For example, when lever 105 is activated (i.e., positioned in the vertical orientation as depicted in FIG. 8), an upper side of base 106 presses against a lower side of the pair of opposing flanges 121, thereby clamping the pair of flanges 121 between seat leg 110 and base 106. Alternatively, when lever 105 is released (i.e., positioned in the horizontal orientation as depicted in FIG. 9), base 106 is lowered, which releases base 106 from contacting the pair of flanges 121. When base 106 is released from contacting the pair of flanges 121, seat leg 110 may be slid along the track 120 for repositioning, or seat leg 110 may be removed from track 120 by passing base 106 through one of the plurality of notches 123 depicted in FIGS. 1-4.

Note that the distance between the pivot axis of pivot mechanism 103 and washer 104 equals D1 in FIG. 8 and D2 in FIG. 9. Because D1>D2, the pivot mechanism 103 raises longitudinal member 101 via radially extending flange 102 in FIG. 8. In contrast, the pivot mechanism 103 allows longitudinal member 101 to lower via radially extending flange 102 in FIG. 9.

In alternative embodiments, pivot mechanism 103 is threaded and radially extending flange 102 is absent. Specifically, ring portion 305 of pivot mechanism 103 (see FIG. 5) is configured to include internal threads in through-hole 307 that match threads of longitudinal member 101. The threaded coupling of pivot mechanism 103 with longitudinal member 101 enables lever 105 to move longitudinal member 101 up/down via pivot mechanism 103 in the absence of radially extending flange 102.

Figure 10:
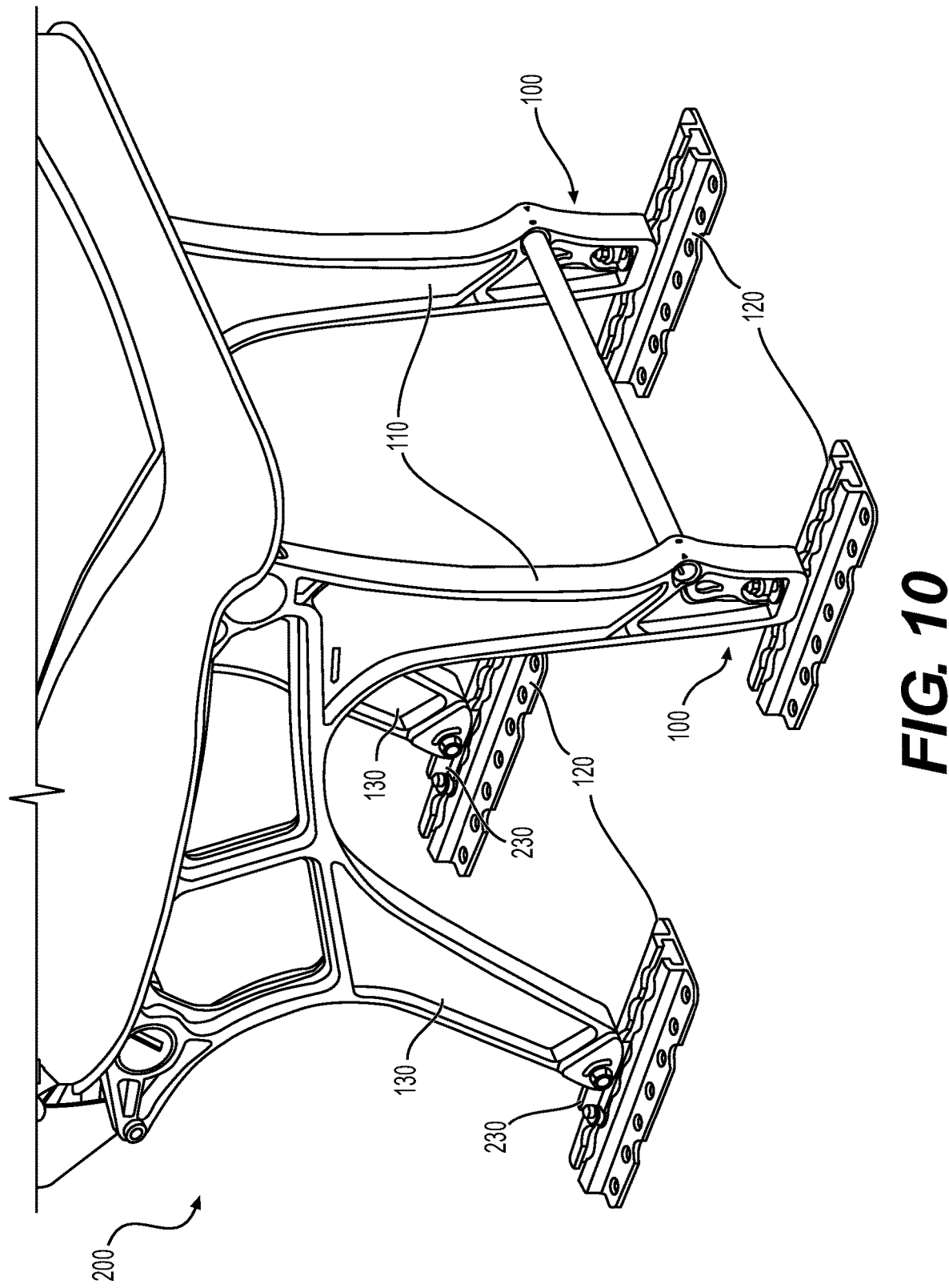
FIG. 10 depicts an aircraft seat having two front legs equipped with the quick-release seat fitting of FIG. 1, in an embodiment.

FIG. 10 depicts an aircraft seat 200 having four legs. Each of the legs is configured for removably securing to a track 120. In the embodiment depicted in FIG. 10, front legs 110 (e.g., legs located beneath a front portion of the seat 200) are equipped with quick-release seat fitting 100 of FIG. 1, while rear legs 130 (e.g., legs located beneath a rear portion of the seat 200) are equipped with an alternative seat fitting 230. The alternative seat fitting 230 may be a conventional seat fitting that requires a small tool, such as a screwdriver, for prying up the fitting to remove seat leg 110 from its respective track 120. In other embodiments that are not depicted, the aircraft seat 200 may be equipped with greater or fewer than two quick-release seat fittings 100, without departing from the scope hereof.

In the arrangement depicted in FIG. 10, rear legs 130 secure seat 200 along the length of their respective floor tracks 120 (e.g., in a longitudinal direction). All four legs (e.g., front legs 110 and rear legs 130) resist up/down movement (e.g., in a vertical direction) and side-to-side (e.g., in a horizontal direction). In certain embodiments, rear legs 130 are configured to resist movement longitudinally along track 120. Front legs 110 add some resistance via friction due to clamping of flanges 121, but prevention of movement in the longitudinal direction replies primarily on rear fittings 230.

For the seat securing system depicted in FIG. 10, installation of seat 200 is toolless via flipping of levers 105 (e.g., by hand) to their upright positions for securing front legs 110. Rear legs 130 are installed by simply pressing fittings 230 into notches 123 of a respective track 120. Removal of the seat is performed by flipping the levers 105 to their horizontal positions for releasing front legs 110, whereas rear legs 130 may still require a screwdriver or similar tool to pry up each seat fitting 230.

Advantages provided by the quick-release seat fitting 100 include reduced weight compared to conventional seat fittings (e.g., ~¼ pound per instance), integration of the mechanism into the seat leg so as to not protrude from the seat leg when secured to the floor track, and a toolless installation for a simpler and easier removal of the seat legs.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims.

The invention claimed is:

1. A quick-release seat fitting for use with a seat, the quick-release seat fitting comprising:
 a seat leg configured to be removably secured to a track;
 a longitudinal member having a first end, a second end opposite the first end, and a middle portion between the first end and the second end, wherein the first end has a radially extending flange, the second end has a radially extending hub, and the middle portion extends longitudinally through a hole in a bottom end of the seat leg;
 a pivot mechanism having a ring portion, a first transverse member, and a second transverse member, wherein the first transverse member and the second transverse member each extend oppositely outside of the ring portion along a pivot axis, and the longitudinal member extends through a through-hole of the ring portion;
 a lever having a first slot and a second slot opposite the first slot, wherein the first slot and the second slot are configured to accept the first transverse member and the second transverse member, respectively, such that the lever is pivotable about the pivot axis, the lever being configured to raise the longitudinal member via the pivot mechanism and the radially extending flange for securing the radially extending hub to the track;
 a first distance between the pivot axis of the pivot mechanism and a bottom surface of the lever, such that when the lever is oriented vertically the pivot axis is raised by the first distance; and
 a second distance between the pivot axis of the pivot mechanism and a façade of the lever, such that when the lever is oriented horizontally the pivot axis is raised by the second distance.

2. The quick-release seat fitting of claim 1, further comprising a recess in the seat leg configured for receiving the lever such that pivoting of the lever into the recess causes the pivot mechanism to push the radially extending flange upwardly thereby raising the longitudinal member to secure the radially extending hub to the track.

3. The quick-release seat fitting of claim 2, wherein the lever is pivoted downwardly out of the recess for releasing the radially extending flange from the track.

4. The quick-release seat fitting of claim 1, further comprising a metal washer disposed in between the lever and the seat leg for providing a wear surface against which the lever rubs during pivoting of the lever.

5. The quick-release seat fitting of claim 4, further comprising a rubber washer disposed between the metal washer and the seat leg.

6. The quick-release seat fitting of claim 1, wherein the second end of the longitudinal member is threaded, and the radially extending flange is likewise threaded for coupling with the second end, such that the radially extending flange may be rotated to adjust its position along the longitudinal member.

7. The quick-release seat fitting of claim 1, wherein the longitudinal member is a threaded stud and the radially extending flange is a nut adapted for coupling with the threaded stud.

8. The quick-release seat fitting of claim 7, wherein the nut is lockable such that a position of the nut along the threaded stud may be maintained over time with no additional parts required.

9. The quick-release seat fitting of claim 1, further comprising a first retaining pin disposed across the first slot for retaining the first transverse member, and a second retaining pin disposed across the second slot for retaining the second transverse member.

10. The quick-release seat fitting of claim 1, wherein the track is secured to a floor, the track comprising:
 a lower portion configured for securing to the floor;
 an upper portion having a plurality of notches alternating with a plurality of pairs of opposing flanges;
 the plurality of notches being configured to fit the radially extending hub therethrough to enable removal of the seat leg from the track;
 a gap between each pair of the plurality of pairs of opposing flanges, the gap being narrower than a diameter of each of the plurality of notches;
 the longitudinal member is slidable through the gap such that the seat leg is slidable along the track when the quick-release seat fitting is released; and
 one pair of the plurality of pairs of opposing flanges is squeezed between the radially extending hub and the bottom end of the seat leg when the quick-release seat fitting is activated.

11. The quick-release seat fitting of claim 1, wherein the first distance is greater than the second distance, such that when the lever is oriented vertically the radially extending hub is secured to the track, and when the lever is oriented horizontally the radially extending hub is released from the track.

12. A quick-release seat fitting, comprising:
 a seat leg configured to be removably secured to a track;
 a threaded stud having a first end and a second end with a shaft portion therebetween, wherein the shaft portion is arranged through an opening in an end of the seat leg, and the second end includes a radially extending base;
 a pivot mechanism having a through-hole arranged around the shaft portion of the threaded stud, the pivot mechanism having a first transverse member and a second transverse member that each extend transversely from the pivot mechanism in opposite directions along a pivot axis;
 a lever having a first slot and a second slot configured to accept the first transverse member and the second transverse member, respectively, such that pivoting of the lever about the pivot axis causes the threaded stud to move upwardly or downwardly via the pivot mechanism thereby raising and lowering the radially extending base for alternately securing the seat leg to the track and releasing the seat leg from the track;
 a first distance between the pivot axis of the pivot mechanism and a bottom surface of the lever, such that when the lever is oriented vertically the pivot axis is raised by the first distance; and
 a second distance between the pivot axis of the pivot mechanism and a façade of the lever, such that when the lever is oriented horizontally the pivot axis is raised by the second distance.

13. The quick-release seat fitting of claim 12, wherein the first distance is greater than the second distance, such that when the lever is oriented vertically the radially extending base is secured to the track, and when the lever is oriented horizontally the radially extending base is released from the track.

14. The quick-release seat fitting of claim 12, further comprising a nut attached via threads to the threaded stud proximate the first end, the nut being configured to rotate about the threads to adjust an upper limit of movement of the threaded stud for adjusting a tightness of the radially extending base within the track.

15. The quick-release seat fitting of claim 12, wherein the through-hole of the pivot mechanism is threaded such that the pivot mechanism threads onto the threaded stud for adjusting an upper limit of movement of the threaded stud thereby adjusting a tightness of the radially extending base within the track.

16. The quick-release seat fitting of claim 12, further comprising a recess in the seat leg configured for receiving the lever, such that the lever is pivoted into the recess when the seat leg is secured to the track.

17. The quick-release seat fitting of claim 12, further comprising a washer disposed between the lever and the seat leg for providing a wear surface against which the lever rubs during movement of the lever.

18. A seat configured for removably securing to a track, the seat comprising:
   a quick-release fitting configured for operation by hand to releasably secure a bottom end of a seat leg to a floor-mounted track for facile adjustment and removal of the seat, the quick-release fitting comprising:
      a threaded stud having a first end and a second end with a shaft portion therebetween, wherein the shaft portion is arranged through an opening in an end of the seat leg, and the second end includes a radially extending base;
      a pivot mechanism having a through-hole arranged around the shaft portion of the threaded stud, the pivot mechanism having a first transverse member and a second transverse member that each extend transversely from the pivot mechanism in opposite directions along a pivot axis;
      a lever having a first slot and a second slot configured to accept the first transverse member and the second transverse member, respectively, such that pivoting of the lever about the pivot axis causes the threaded stud to move upwardly or downwardly via the pivot mechanism thereby raising and lowering the radially extending base for alternately securing the seat leg to the track and releasing the seat leg from the track; and
      a first retaining pin disposed across the first slot for retaining the first transverse member, and a second retaining pin disposed across the second slot for retaining the second transverse member.

19. The seat of claim 18, wherein the through-hole of the pivot mechanism is threaded such that the pivot mechanism threads onto the threaded stud for adjusting an upper limit of movement of the threaded stud thereby adjusting a tightness of the radially extending base within the track.

20. The seat of claim 18, comprising:
   a first distance between the pivot axis of the pivot mechanism and a bottom surface of the lever, such that when the lever is oriented vertically the pivot axis is raised by the first distance; and
   a second distance between the pivot axis of the pivot mechanism and a façade of the lever, such that when the lever is oriented horizontally the pivot axis is raised by the second distance.

\* \* \* \* \*